United States Patent
Huo et al.

(10) Patent No.: US 9,429,668 B2
(45) Date of Patent: Aug. 30, 2016

(54) ITERATIVE DIP-STEERING MEDIAN FILTER FOR SEISMIC DATA PROCESSING

(71) Applicant: Saudi Arabian Oil Company, Dhahran (SA)

(72) Inventors: Shoudong Huo, Ras Tanura (SA); Weihong Zhu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 929 days.

(21) Appl. No.: 13/714,654

(22) Filed: Dec. 14, 2012

(65) Prior Publication Data

US 2013/0155813 A1 Jun. 20, 2013

Related U.S. Application Data

(60) Provisional application No. 61/570,916, filed on Dec. 15, 2011.

(51) Int. Cl.
| | | |
|---|---|---|
| *G01V 1/00* | (2006.01) | |
| *G01V 1/30* | (2006.01) | |
| *G01V 1/36* | (2006.01) | |

(52) U.S. Cl.
CPC .............. *G01V 1/301* (2013.01); *G01V 1/364* (2013.01); *G01V 2210/3248* (2013.01)

(58) Field of Classification Search
None
See application file for complete search history.

(56) References Cited

U.S. PATENT DOCUMENTS

| | | | | |
|---|---|---|---|---|
| 2006/0050612 A1* | 3/2006 | Zerouk | .................. | G01V 1/364 367/46 |
| 2013/0194893 A1* | 8/2013 | Nagarajappa | .......... | G01V 1/364 367/43 |

FOREIGN PATENT DOCUMENTS

| | | |
|---|---|---|
| EP | 2360495 A1 | 8/2011 |
| WO | 03003054 A2 | 1/2003 |

OTHER PUBLICATIONS

Bednar, J. "Applications of median filtering to deconvolution, pulse estimation, and statistical editing of seismic data" Geophysics, Society of Exploration Geophysicists, vol. 48, No. 12, Dec. 1983, pp. 1598-1610.

Curry, W. "Interpolation with Fourier-radial adaptive thresholding" Geophysics, Society of Exploration Geophysicists, vol. 75, No. 6, Nov.-Dec. 2010, pp. WB95-WB102.

Duncan and Beresford "Some analyses of 2-D median f-k filters" Geophysics, Society of Exploration Geophysicists, vol. 60, No. 4, Jul.-Aug. 1995, pp. 1157-1168.

(Continued)

*Primary Examiner* — Aditya Bhat

(74) *Attorney, Agent, or Firm* — Bracewell LLP; Constance G. Rhebergen; Albert B. Kimball, Jr.

(57) ABSTRACT

An iterative dip-steering median filter is provided for random noise attenuation in seismic data where conflicting dips are indicated in the data. A number of dominant dips inside a processing window or sample of the data are identified by a Fourier-radial transform in the frequency-wavenumber domain. A median filter is then applied along the dominant dip to remove noise, and the remaining signal after filtering is retained for further median filter iterations. Iterations are repeated to apply the median filter along the most dominant dip in the remaining data. The processing continues in subsequent iterations until all selected dips have been processed. The remaining signal of each iteration is then summed for final output.

8 Claims, 15 Drawing Sheets

(56) References Cited

OTHER PUBLICATIONS

Huo et al. "Simultaneous sources separation via multidirectional vector-median filtering" Geophysics, Society of Exploration Geophysicists, vol. 77, No. 4, Jul. 1, 2012, pp. V123-V131.
International Search Report and Written Opinion, PCT/US2012/069736, mailed Oct. 16, 2013.
Liu et al. "A 2D multistage median filter to reduce random seismic noise" Geophysics, Society of Exploration Geophysicists, vol. 71, No. 5, Sep.-Oct. 2006, pp. V105-V110.
Liu et al. "Vector Median Filter and its Applications in Geophysics" SEG Houston 2009 International Exposition and Annual Meeting, downloaded Dec. 5, 2011, pp. 3342-3346.
Zhang and Ulrych "Multiple suppression based on the migration operator and a hyperbolic median filter" SEG, Expanded Abstracts, downloaded Nov. 13, 2011, pp. 1949-1952.

* cited by examiner

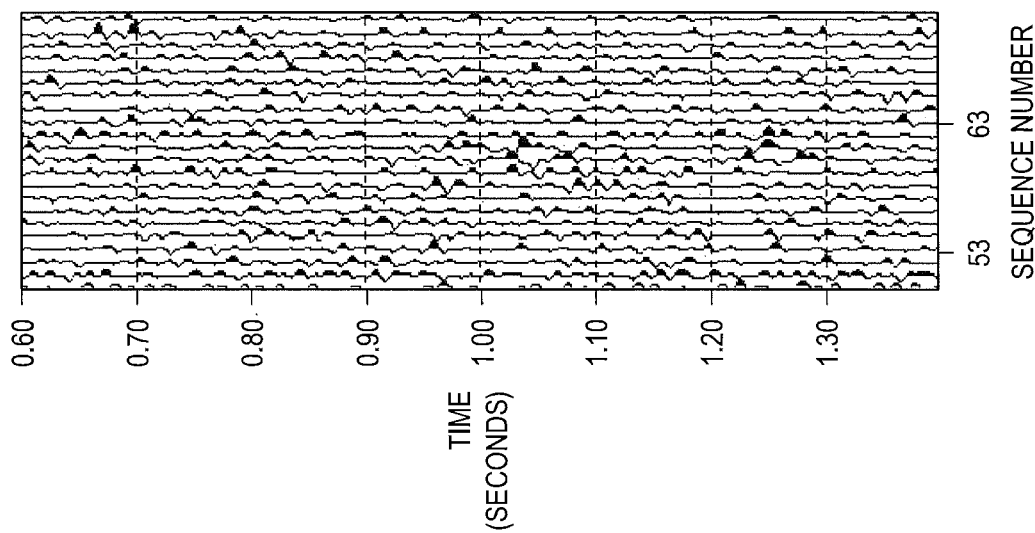
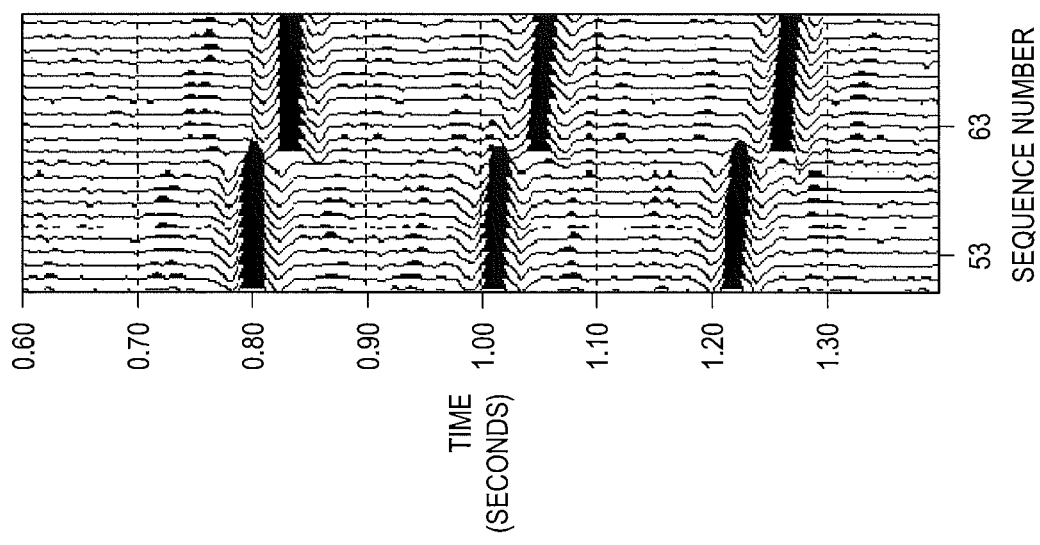
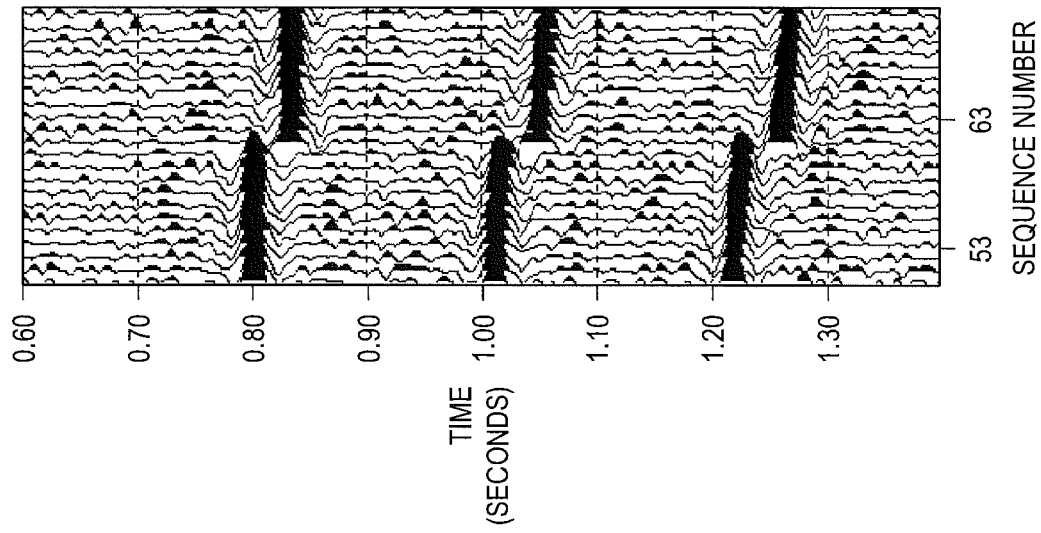

ITERATIVE DIP-STEERING MEDIAN FILTER FOR SEISMIC DATA PROCESSING

CROSS REFERENCE TO RELATED APPLICATIONS

This application claims priority from U.S. Provisional Application No. 61/570,916, filed Dec. 15, 2011. For purposes of United States patent practice, this application incorporates the contents of the Provisional application by reference in entirety.

BACKGROUND OF THE INVENTION

1. Field of the Invention

The present invention relates to seismic data processing for analysis of subsurface formation structure, and in particular to an iterative dip-steering median filter for such processing.

2. Description of the Related Art

Noise attenuation has been important in seismic data processing for producing more accurate representations of the results of seismic surveys in areas of interest. Enhancement of the signal to noise ratio in pre-stack gathers of the seismic data can result in better subsequent processing, imaging and interpretation.

A number of signal processing techniques have been employed in efforts to suppress noise. These techniques have been categorized into three main groups: frequency-space (f-x) domain prediction filtering, the singular value decomposition (SVD) method and median filtering.

Random noise attenuation by predictive deconvolution in the f-x domain was introduced some years ago. F-x deconvolution has been based on the assumption that the spatial signals at each single frequency are composed of a sum of a limited number of complex harmonics. In the presence of noise, autoregressive models are suitable to predict a superposition of harmonics. F-x deconvolution was effective in attenuating random noise and could handle events with what are known as conflicting dips. Conflicting dips refer to situations where the seismic data indicate more than one likely dip might be present. However, f-x deconvolution has been known to distort signal levels significantly when extremely strong noise exists. It has thus been proposed to adopt projection filters instead of the predictive filter.

Singular value decomposition (SVD) has been another tool to enhance laterally coherent events in seismic gathers. Singular value decomposition forms a data-covariance matrix before employing an eigenvalue decomposition to extract the coherent events. SVD can effectively suppress random noise by summing only the contributions of the largest singular values, which represent the laterally coherent signals. Expanded SVD applications have been used for seismic data in the f-x domain.

Median filtering has also been widely accepted in the oil and gas industry. An article: Bednar, J. B., 1983, "Applications of median filtering to deconvolution, pulse estimation, and statistical editing of seismic data", Geophysics, 48, 1598-1610, discussed some applications of median filtering in seismic prospecting. An article: Duncan, G., and G. Beresford, 1995, "Some analyses of 2D median f-k filters", Geophysics, 60, 1157-1168, introduced a 2D median f-k filter which used the coefficients of a truncated impulse response of an f-k filter as the weight coefficients for the weighted median process. An article: Zhang, R., and T. J. Ulrych, 2003, "Multiple suppression based on the migration operator and a hyperbolic median filter", SEG, Expanded Abstracts, 1949-1952, discussed use of a hyperbolic median filter to suppress multiples, while an article by Liu, C., Y. Liu, B. Yang, D. Wang, and J. Sun, 2006, "A 2D multistage median filter to reduce random seismic noise", Geophysics, 71, V105-V110 adapted a 2D multistage median filter to suppress the random noise in land seismic data. An article by Liu, Y., Y. Luo, and Y. Wang, 2009, "Vector median filter and its Applications in Geophysics", SEG, Expanded Abstracts, 29, 3342-3346, proposed to apply a vector median filter (VMF) in geophysics. An article by Huo, S., Luo, Y., and P. G. Kelamis, 2009, "Simultaneous sources separation via multi-directional vector-median filter" SEG Expanded Abstracts 28, 31-35, discussed expansion of the vector median filter to a multi-directional vector median filter (MD-VMF) for the purpose of separating blended field seismic data.

Median filter processing has assumed that coherent events have been flattened beforehand, while MD-VMF filtering assumed that there was a single dip in the operation window. Therefore, so far as is known, neither the median filter nor the multi-directional vector median filter method could, so far as is known, handle a seismic gather with conflicting dips.

The technique known a frequency-wavenumber (or F-K) filtering was used when the seismic data indicated conflicting dips. Experience has shown that a frequency-wavenumber filter was not an edge-preserving filter and had edge effects after filtering. An F-K filter did not perform satisfactorily in eliminating spike or impulse noise. As noted above, a median filter, being an edge-preserving filter, was typically suitable for attenuating spike noise, but could only work on flattened events.

SUMMARY OF THE INVENTION

Briefly, the present invention provides a new and improved computer implemented method of processing seismic data, in which time-spatial processing results of the data indicate conflicting dips, to attenuate random noise in the seismic data. According to the computer implemented method of the present invention, the time-spatial processing results of seismic data are assembled in the computer to form a series of overlapping time-spatial sample windows of the seismic data. An individual one of the sample windows of the seismic data is transformed into the frequency-wavenumber domain. The frequency-wavenumber domain data obtained from transforming the sample window data is then transformed into the Fourier-radial domain. A map of peak values of the Fourier-radial domain data of the sample window is determined, and selected ones of the peak values of the Fourier-radial domain data are transformed to indicate dominant dips in data of the sample window. A median filter is applied to the data in the sample window of the seismic data along a selected one of the indicated dominant dips to attenuate noise in the data of the sample window. The remaining signal of the median filtered is stored.

The present invention also provides a new and improved data processing system for seismic data, in which time-spatial processing results of the data indicate conflicting dips, to attenuate random noise in the seismic data. The data processing system includes a data storage memory storing the time-spatial processing results of the seismic data and a processor. The processor of the data processing system assembles the time-spatial processing results of seismic data in the computer to form a series of overlapping time-spatial sample windows of the seismic data, and transforms an individual one of the sample windows of the seismic data into the frequency-wavenumber domain. The processor then transforms the frequency-wavenumber domain data obtained from transforming the sample window data into the Fourier-radial domain, and determines a map of peak values of the Fourier-radial domain data for the sample window. The processor then transforms selected ones of the peak values of the Fourier-radial domain data according to dominant dips indicated in the data of the sample window. The processor applies a median filter to the data of the sample window along a selected one of the indicated dominant dips to attenuate noise in the sample window. The processor then stores the remaining signal of the median filtered data for the sample window.

The present invention also provides a new and improved data storage device having stored in a computer readable medium computer operable instructions for causing a data processing system to process seismic data, in which time-spatial processing results of the data indicate conflicting dips, to attenuate random noise in the seismic data. The instructions stored in the data storage device cause the data processing system assemble the time-spatial processing results of seismic data in the computer to form a series of overlapping time-spatial sample windows of the seismic data. The instructions also cause the data processing system to transform an individual one of the sample windows of the seismic data into the frequency-wavenumber domain, and transform the frequency-wavenumber domain data obtained from transforming the sample window data into the Fourier-radial domain. The instructions also cause the data processing system to determine a map of peak values of the Fourier-radial domain data of the sample window, and transform selected ones of the peak values of the Fourier-radial domain data according to indicate dominant dips in the sample window data. The instructions cause the data processing system to apply a median filter to the data in the sample window of the seismic data along a selected one of the indicated dips to attenuate noise in the data of the sample window. The instructions cause the data processing system to then store the remaining signal of the median filtered data for the sample window.

BRIEF DESCRIPTION OF THE DRAWINGS

FIGS. 5A, 5B, 5C, 5D and 5E are another set of plots of processed seismic data.

DETAILED DESCRIPTION OF THE PREFERRED EMBODIMENTS

With the present invention, an iterative dip-steering median filter is provided for random noise attenuation in seismic data used for analysis of subsurface structure of interest. As will be set forth, the data are processed by searching for several dominant dips in data windows after a Fourier-radial transform is performed on the data. Median filtering is then applied in a descending sequence. In this way, random noise can be eliminated in data which has conflicting dips.

A flow chart F (FIG. 1) composed of a set of data processing steps illustrates the structure of the logic of the present invention as embodied in computer program software. The flow chart F is a high-level logic flowchart which illustrates a method according to the present invention of processing seismic data by iterative dip-steering median filtering according to the present invention. It should be understood that the flow charts illustrate the structures of computer program code elements that function according to the present invention. The invention is practiced in its essential embodiment by computer components that use the program code instructions in a form that instructs a digital data processing system D (FIG. 2) to perform a sequence of processing steps corresponding to those shown in the flow chart F. The flow chart F of FIG. 1 contains a preferred sequence of steps of computer implemented processing data for iterative dip-steering median filtering of the seismic data in data processing system D for random noise attenuation.

The flow chart F is a high-level logic flowchart which illustrates a processing methodology according to the present invention. The method of the present invention is performed in a computer 10 (FIG. 2) of the data processing system D and can be implemented utilizing the computer program steps of FIG. 1 which are stored in memory 12 and executable by system processor 14 of computer 10. As will be set forth, the flow chart F illustrates a preferred embodiment of iterative dip-steering median filtering of seismic data with the data processing system D to attenuate unwanted random noise in the data and for related purposes.

Figure 1:
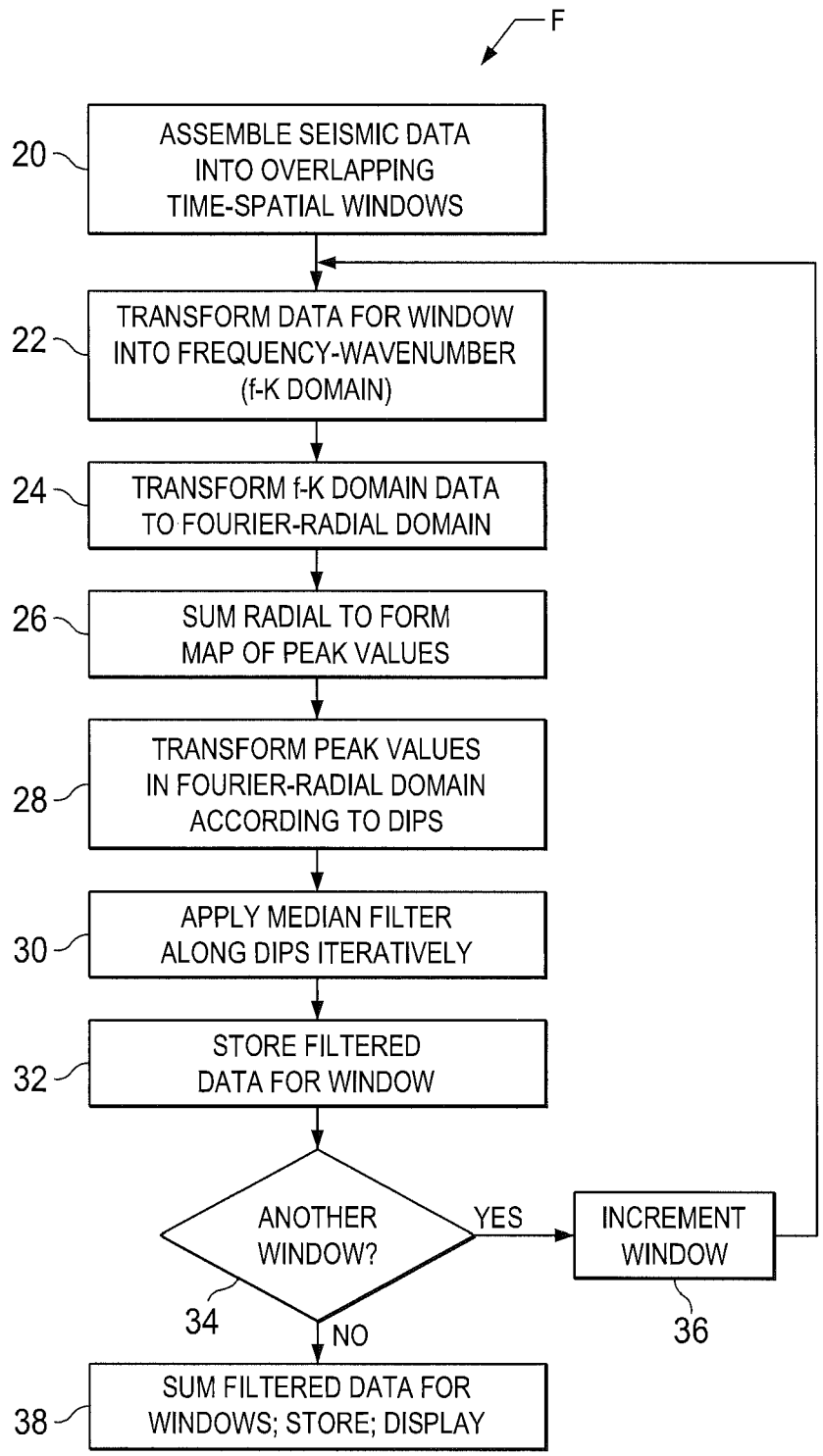
FIG. 1 is a functional block diagram of a set of data processing steps performed in a data processing system for an iterative dip-steering median filter according to the present invention.

During step 20 (FIG. 1) of the flow chart F, the input seismic data in the memory of the data processing system D is separated and assembled into a number of time-spatial overlapped small data sample windows. It should be understood that the input seismic data for processing according to the present invention may be either pre-stack gathers or post-stack sections. Beginning with a first of the time-spatial windows and in successive iterations of the other data windows into which the input data is assembled, the processing proceeds in the following sequence as shown in FIG. 1.

During step 22, a selected time-spatial sample window of seismic data to be processed is transformed from the time-spatial domain into the frequency-wavenumber (f-k) domain. During step 24, the f-k domain data resulting from step 22 being performed on the sample window data is transformed to the Fourier-radial domain, preferably using what is known as a wrapped radial trace transform.

During step 26, a map of peak values is formed by the summation of each radial indicated in the Fourier-radial transform data resulting from step 24. In step 28, selected peak values in the Fourier-radial domain peak value map formed during step 26 are evaluated to indicate dominant dips in the original t-x domain data for the sample window. The dips are evaluated in dominance in the order of their respective peak value indicated in the peak value map.

During step 30, a median filter is then applied along the angle of a first selected one of the dominant dips indicated during step 28 to attenuate noise from the signal. The median filtering step 30 is performed iteratively along different indicated dips in a descending sequence of their respective peak values indicated in the peak value map. As multiple dominant dips are usually present, the iterative approach of filtering along dips in a descending sequence of indicated peak values is utilized with the present invention. For each processing iteration of median filtering, the median filter applied as part of step 30 is applied along the corresponding angle of the remaining dip with the largest indicated peak value amongst the remaining ones. The processing continues for each of the selected dips. After each iteration during step 30, the previously estimated signal data is subtracted from the input data, and the remaining or residual data is used as the input data for subsequent median filtering iterations during step 30 for the sample window data. The residual data is also stored in computer memory. At the conclusion of median filtering along each of the selected dominant dips indicated by the peak value map, the remaining noise attenuated signal is summed to form a final output value for the sample data window. The result is a dip-steered median filtering final output of noise attenuated data for the sample window currently being processed. The number of the iterations during median filtering step 30 for a sample window depends on the complexity of the data (i.e., the number of conflicting dips indicated present in the data for the sample window).

The median filtered data resulting from step 30 for the sample window currently being processed is then stored in memory of the data processing system D during step 32. During step 34, a determination is made whether each of the sample windows in the input data have been processed. If not, the data window sequence or count is incremented during step 36 to a new data window of interest and processing returns to step 22 for continuing the processing in the manner described above. The sequence of processing data for successive sample windows continues in this manner until each of the data sample windows of the input time-spatial data of interest are processed.

When during step 34 it is determined that such processing is completed, a step 38 causes the signal output of each time-spatial data sample window to be assembled from memory of the data processing system D. Step 38 produces output seismic displays with display 26 of the dip-steered median filtered noise attenuated seismic data for analysis, interpretation and evaluation.

Figures 3A, 3B, 3C:
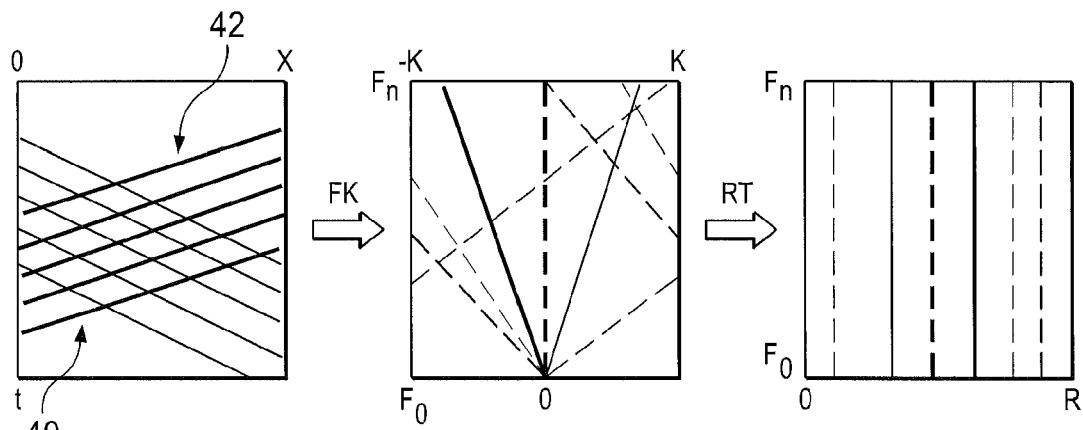
FIGS. 3A, 3B and 3C are schematic diagrams of transforms of sample plane waves in different domains.

The processing sequence shown in FIG. 1 and described above can be further understood based on the following analysis. A plane wave $d(x,t)$ in the t-x domain can be expressed as $$d(x,t)=w(t) \otimes \delta(t-t_0-px), \quad (1)$$

where a wavelet $w(t)$ is convolved with a linear event with dip p and interception $t_0$. FIG. 3A is a representation of several plane waves in a data sample time window in the t-x domain. As can be seen, a set of plane waves 40 and 42 have conflicting dips.

Transforming Equation (1) to the f-x domain results in:

$$D=(x,\omega)=W(\omega)e^{-i\omega px}e^{-iwt_0}, \quad (2)$$

where $\omega$ denotes temporal frequency. The plane waves of FIG. 3A represented by Equation (2) are then transferred to the f-k domain during step 22, to obtain:

$$D(k_x,\omega)=W(\omega)e^{-iwt_0}\delta(k_x+p\omega), \quad (3)$$

where $k_x$ stands for wavenumbers. FIG. 3B is an illustration of plane waves in the frequency-wavenumber or f-k domain, based on those in the f-x domain shown in FIG. 3A.

Moving from f-k Cartesian coordinates to r-θ polar coordinates, results in:

$$D(r,\theta)=W(r\cos\theta)e^{-it_0 r\cos\theta}\delta(r\sin\theta+pr\cos\theta), \quad (4)$$

where $\omega=r\cos\theta$ and $k_x=r\sin\theta$. Isolating θ in Equation (4), results in a Fourier-radial transform during step 24:

$$D(r,\theta) = W(r\cos\theta)e^{it_0 r\cos\theta}\delta\left(\theta - \frac{\pi}{2} - \tan^{-1}p\right). \quad (5)$$

FIG. 3C is an illustration of plane waves in the Fourier-radial or r-θ domain, based on those shown in FIGS. 3A and 3B.

As can be seen in FIG. 3C, in the Fourier-radial domain, an original t-x event in the data transfers to a line at $\theta=\tan^{-1}p$, which does not vary as a function of r.

A map of dominant dips is then produced during step 26 by summing the energy of each indicated θ.

$$M(\theta)=\Sigma_{n=1}^{N_r}\|D(r_N,\theta)\| \quad (6)$$

The peak values in the function $M(\theta)$ are indicators of the dips or slopes in the t-x domain with dominant energy. A peak value is picked when it is bigger than its two neighboring values. Several peak values can be identified but only a number of the largest values are required. The number of peak values can be decided according to the number of conflicting dips in the t-x window.

After identifying the peak values of $M(\theta)$ in the Fourier-radial domain during step 28, the corresponding dips in the t-x domain are determined. These dips are then used to guide the median filtering during step 30 in the t-x domain for estimating signal data.

Conventionally, a scalar median value for median filtering could be defined by sorting. Given a set of scalars $\{x_i|i=1,\ldots,N\}$, the set can be sorted in an ascending or descending order, and the dip value in the middle of the ordered can then be established or set as the median value.

The filter can be also be defined as the minimum of the sums of the distances from the median value to the rest of members in the set. It can be described as follows:

$$D(x_j) = \sum_{i=1}^{N} \|x_j - x_i\|_l \quad (7)$$

$$x_j \in \{x_i \mid i=1,\ldots,N\}$$

Equation (7) defines the sum of distances from one member of the set of dip values to the rest of the members in the set, where $j=1,\ldots,N$ and l denotes the order of the norm. The median scalar $x_m$ can then be selected from the set that satisfies Equation (8).

$$x_m = \underset{x_j}{\arg\min}\, D(x_j). \quad (8)$$

If an L1 norm is used (l=1), the median values defined using both methods are identical. However, if a non-L1 norm is adopted, the median values based on definitions of sorting or minimum distance could be different. For example, for a set numbers consisting of $\{1, 2, 3, 4, 1000\}$, the median value is 3 according to L1-norm minimum distance, or sorting definition, and 4 based on the L2-norm minimum distance definition. Since the norm order is adjustable according to specific applications, it should be understood that the minimum distance definition could be more flexible in practice than the sorting-based definition. (Astola et al., "Vector Median Filters, Proceedings of the IEEE, Vol. 78, pp. 678-689, April, 1990).

Figure 2:
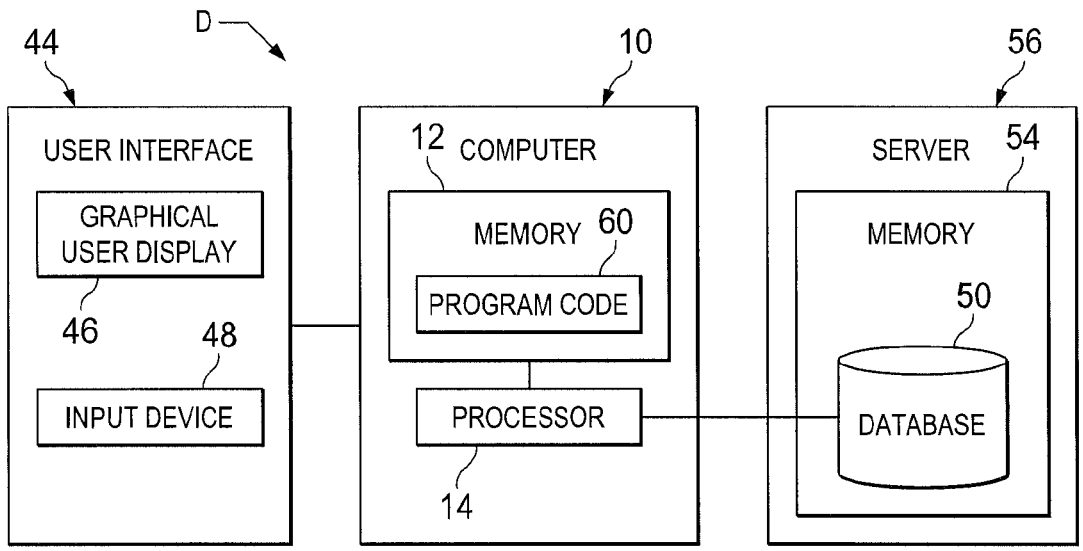
FIG. 2 is a schematic block diagram of a data processing system for an iterative dip-steering median filter according to the present invention.

As illustrated in FIG. 2, the data processing system D includes the computer 10 having the processor 12 and memory 14 coupled to the processor 12 to store operating instructions, control information and database records therein. The computer 10 may, if desired, be a multicore processor with nodes such as those from HP, Intel Corporation or Advanced Micro Devices (AMD). The computer 20 may also be a mainframe computer of any conventional type of suitable processing capacity such as those available from International Business Machines (IBM) of Armonk, N.Y. or other source. As noted below, other digital processors may also be used, as well.

It should be noted that other digital processors, may be used, such as personal computers in the form of a laptop computer, notebook computer or other suitable programmed or programmable digital data processing apparatus.

The processor 10 is typically in the form of a computer having a user interface 44 and an output display 46 for displaying output data or records of processing of seismic data measurements performed according to the present invention. The output display 46 includes components such as a printer and an output display screen capable of providing printed output information or visible displays in the form of graphs, data sheets, graphical images, data plots and the like as output records or images.

The user interface 44 of computer 10 also includes a suitable user input device or input/output control unit 48 to provide a user access to control or access information and database records and operate the computer 10. Data processing system D further includes a database 50 stored in memory, which may be internal memory 12, or an external, networked, or non-networked memory as indicated at 54 in an associated database server 56.

The data processing system D includes program code 60 stored in memory 12 of the computer 10. The program code 60, according to the present invention is in the form of computer operable instructions causing the data processor 14 to form dip-steered median filtered seismic data for analysis, interpretation and evaluation, as has been set forth.

It should be noted that program code 60 may be in the form of microcode, programs, routines, or symbolic computer operable languages that provide a specific set of ordered operations that control the functioning of the data processing system D and direct its operation. The instructions of program code 60 may be may be stored in memory 12 of the computer 10, or on computer diskette, magnetic tape, conventional hard disk drive, electronic read-only memory, optical storage device, or other appropriate data storage device having a non-volatile computer usable medium stored thereon. Program code 60 may also be contained on a data storage device such as server 56 as a computer readable medium, as shown.

The effectiveness of the dip-steering median filter according to the present invention is demonstrated by the applications of its methodology on both synthetic and real data gathers. Comparisons are also made with data which has been processed by the commonly used noise removal method, namely f-x predictive deconvolution.

Figure 4A:
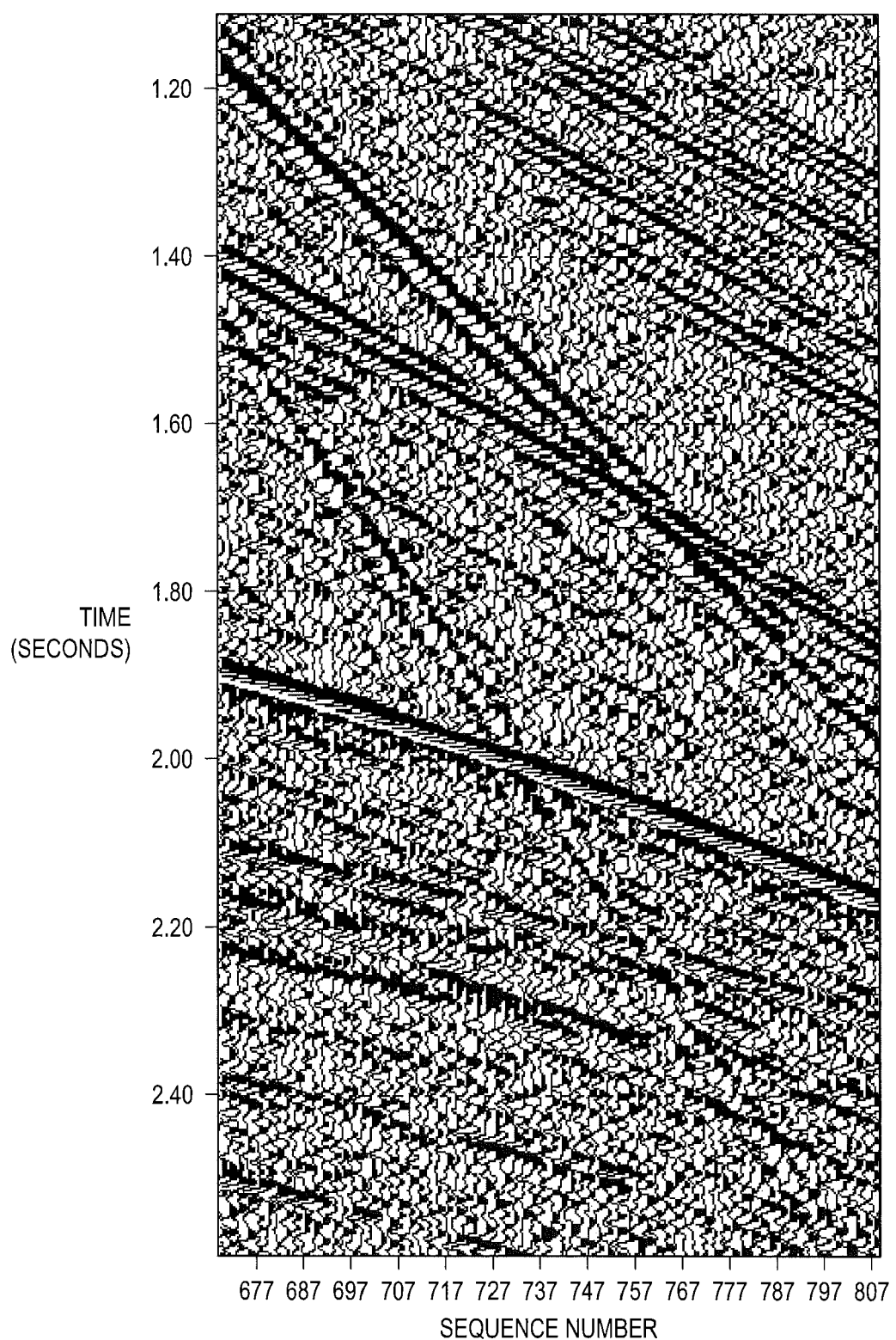
FIGS. 4A, 4B and 4C are a set of plots of processed seismic data.
Figure 4B:
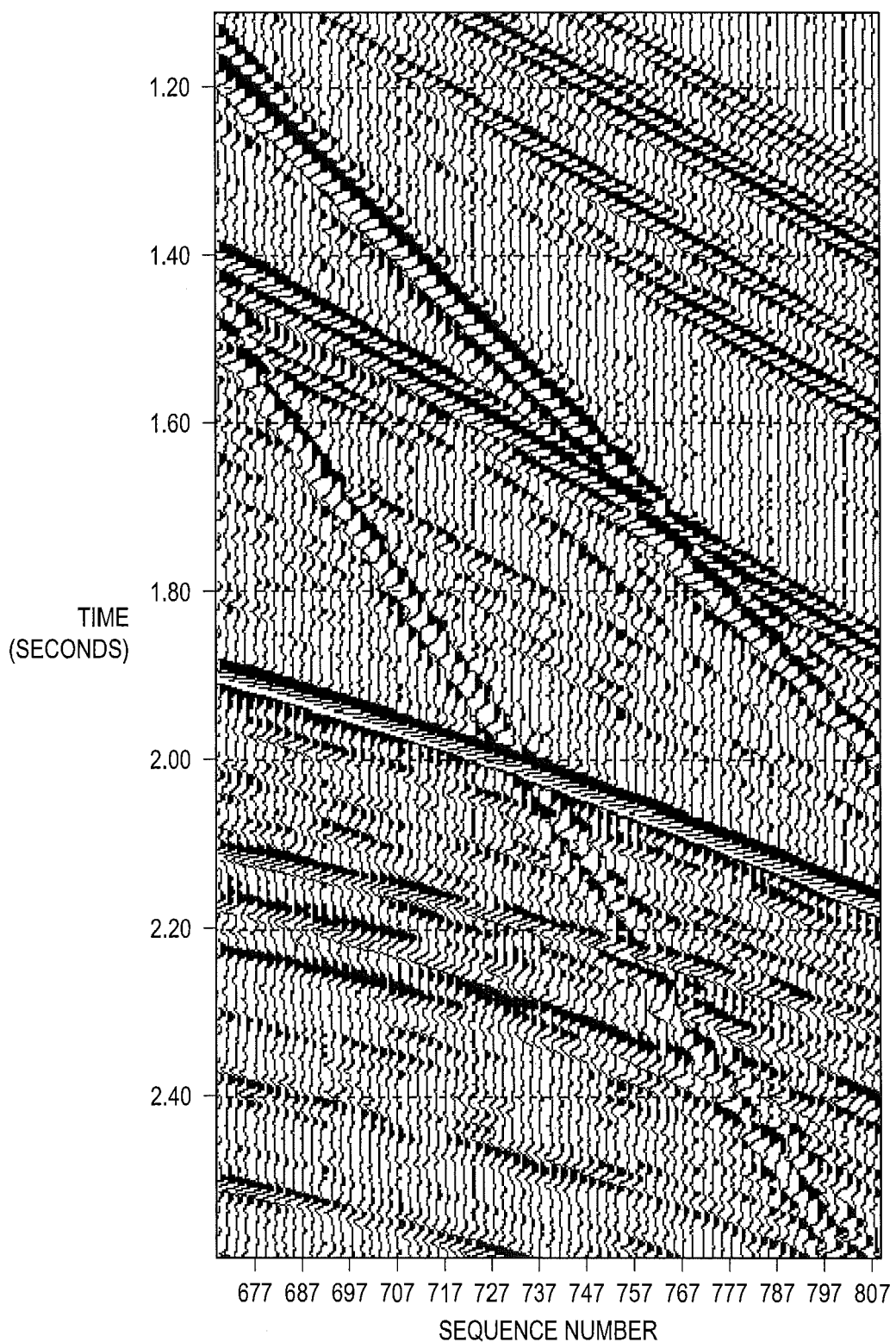
Figure 4C:
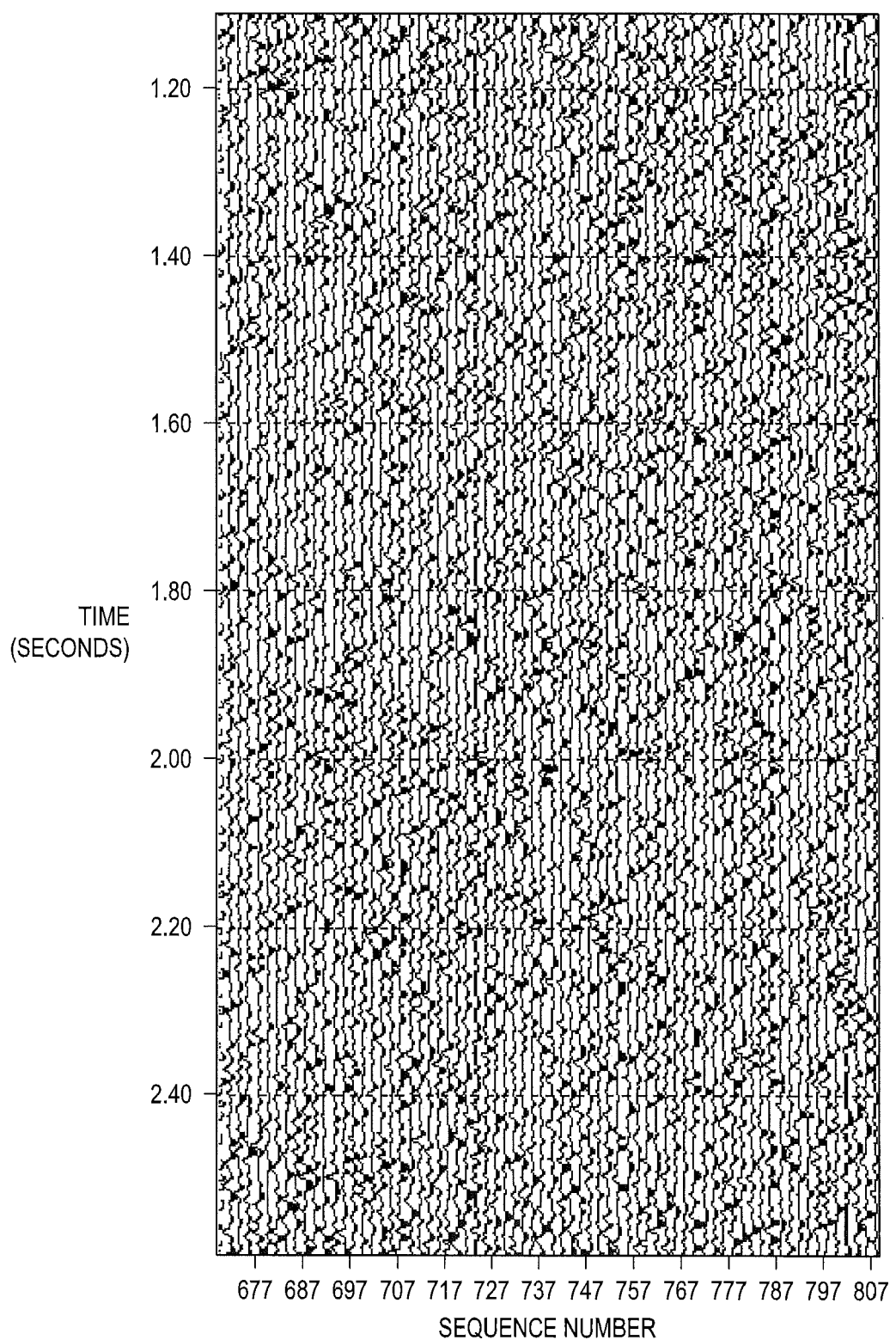

Consider a noisy synthetic shot gather that is composed of several conflicting dips as shown in FIG. 4A. Observing the data, five different dips can be identified for the signal. However, if sliding data over the data is defined as 25 traces and 50 time samples, only two conflicting dips can be found in each window. Therefore, two iterations with a 5-point median filter are used for processing according to the present invention. FIG. 4B depicts the filtering result according to the present invention, where the noise has been well attenuated. FIG. 4C illuminates the eliminated energy. It can be observed that no coherent events (signal) have been mistakenly suppressed.

Figure 5E:
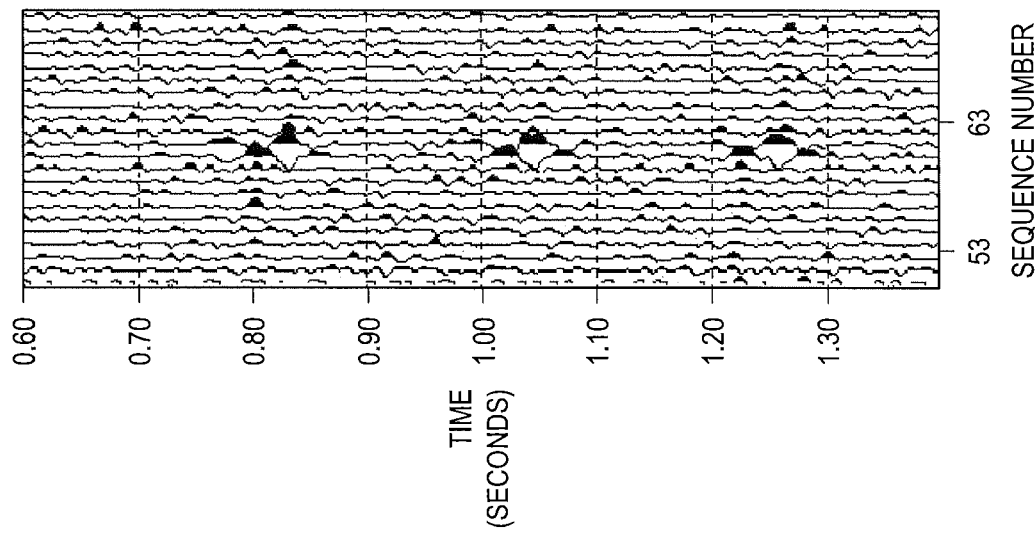
Figure 5D:
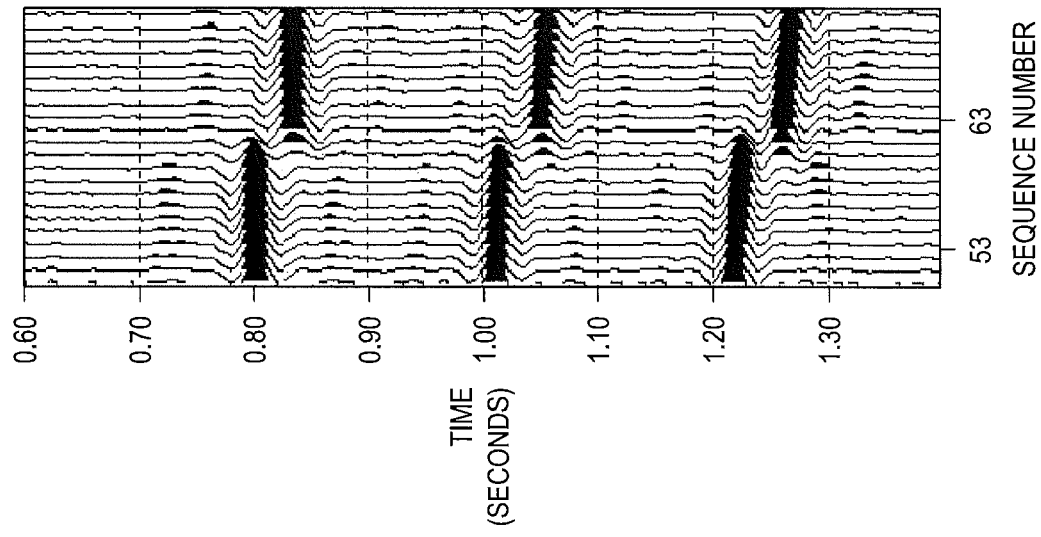

FIG. 5A shows a noisy synthetic gather with discontinuity. FIGS. 5B and 5D are the filtering results by dip-steering median filter according to the present invention and conventional f-x predictive deconvolution, respectively. Although both methods can be seen to attenuate the random noise to a differing extent, the dip-steering median filter data of FIG. 5B better preserves the discontinuities than the data of FIG. 5D. Similar conclusions can be drawn by comparing the data displays of FIGS. 5C and 5E. FIG. 5C is a plot of the differences in data content between FIGS. 5A and 5B, while FIG. 5E is a plot of the differences between FIG. 5A and FIG. 5D.

Figure 6A:
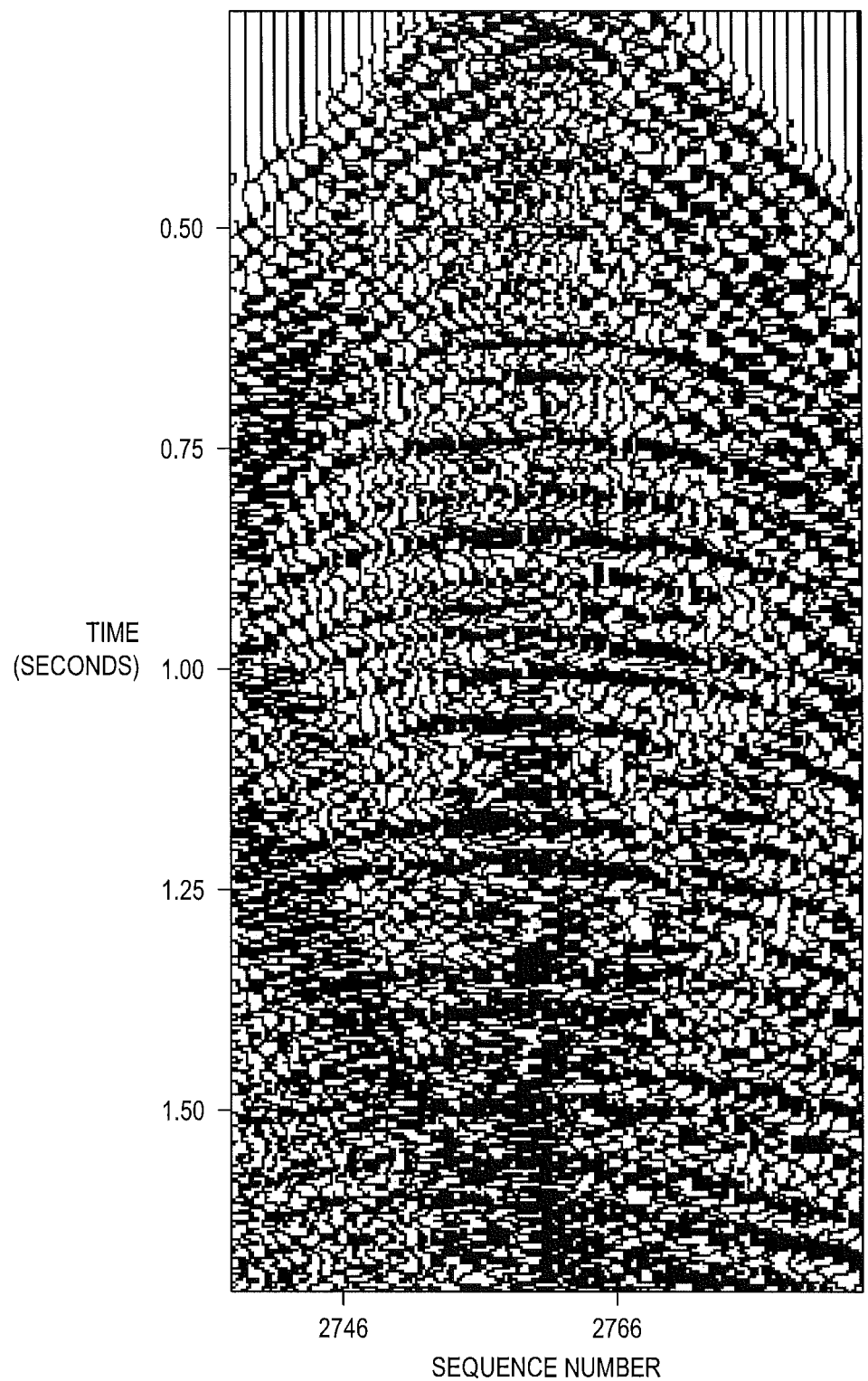
FIGS. 6A, 6B and 6C are a further set of plots of processed seismic data.
Figure 6B:
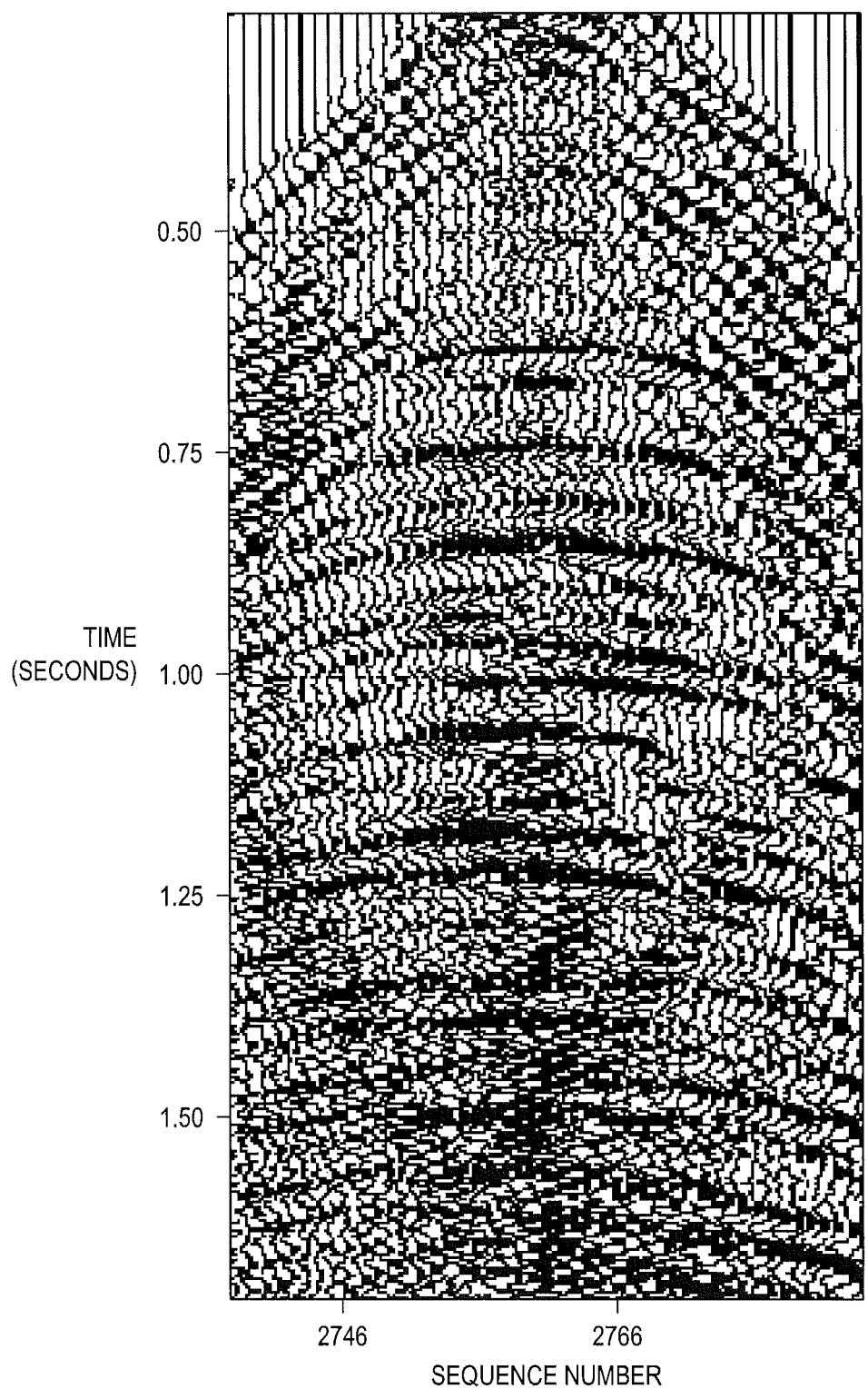
Figure 6C:
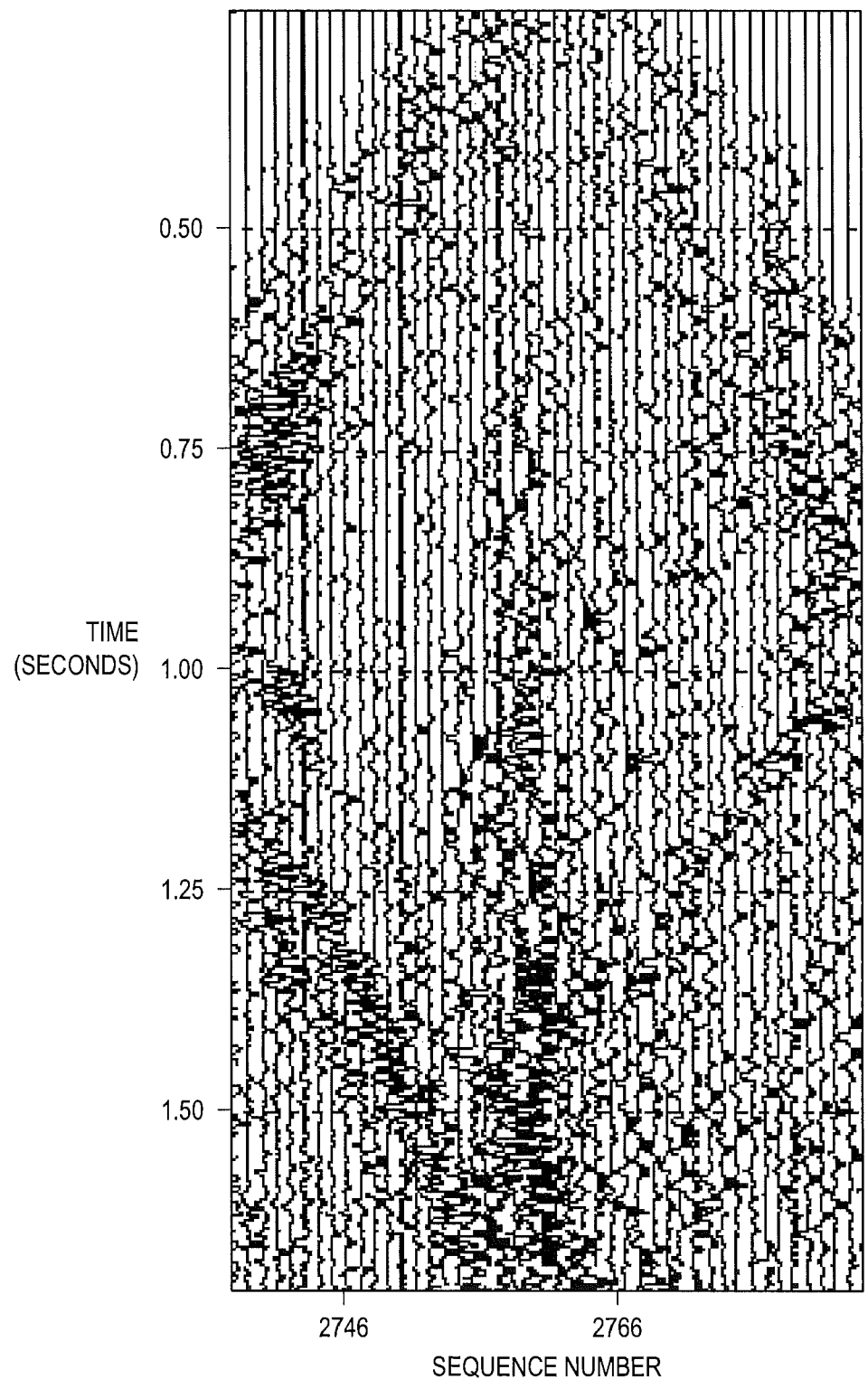

FIG. 6A is a sample shot gather of actual land seismic data. FIG. 6B shows the filtering result by a 3-iteration dip-steering median filter according to the present invention, and FIG. 6C is a plot of the attenuated energy. The signal to noise ratio can be seen in FIG. 6B to be well enhanced while little signal leakage can be observed in FIG. 6C.

Figure 7A:
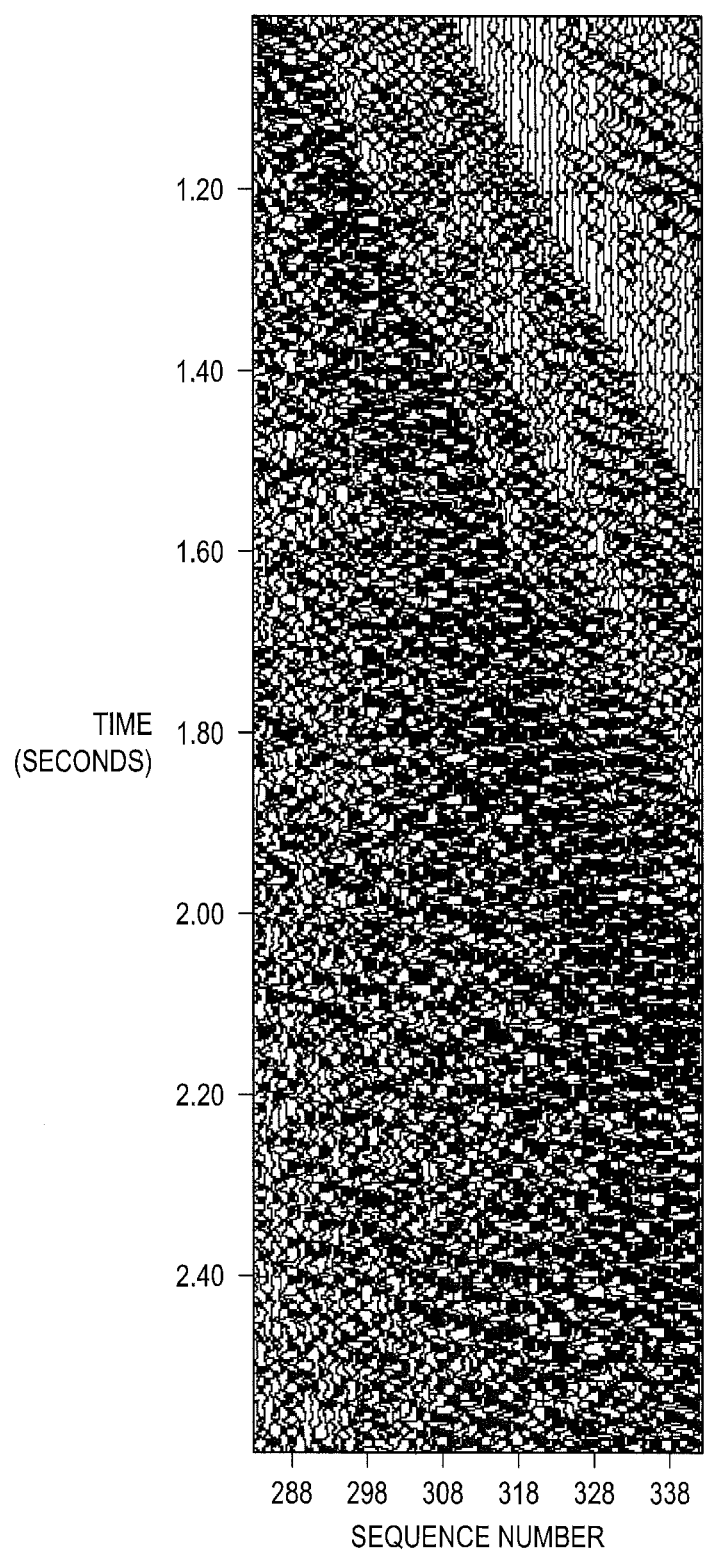
FIGS. 7A, 7B, 7C, 7D and 7E are an additional set of plots of processed seismic data.
Figure 7B:
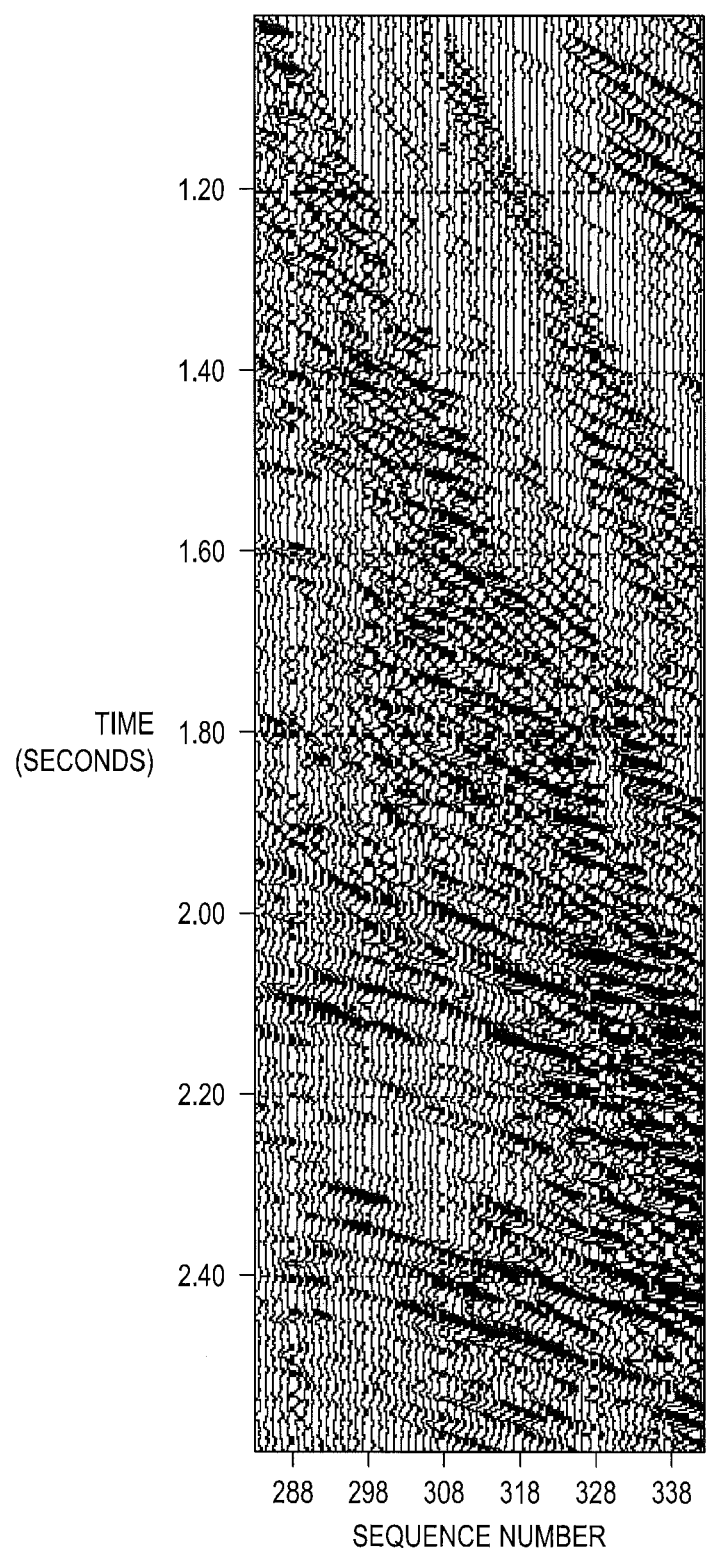
Figure 7C:
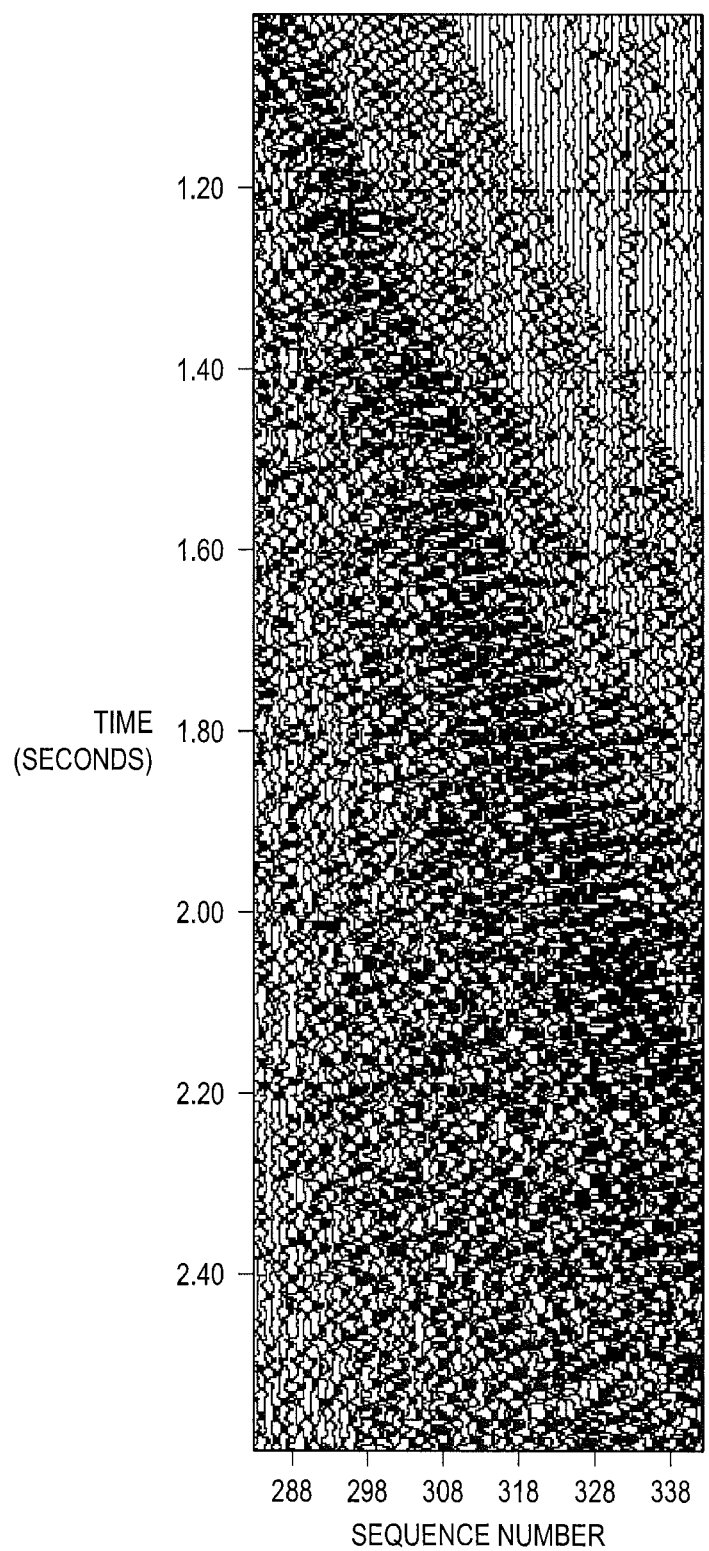
Figure 7D:
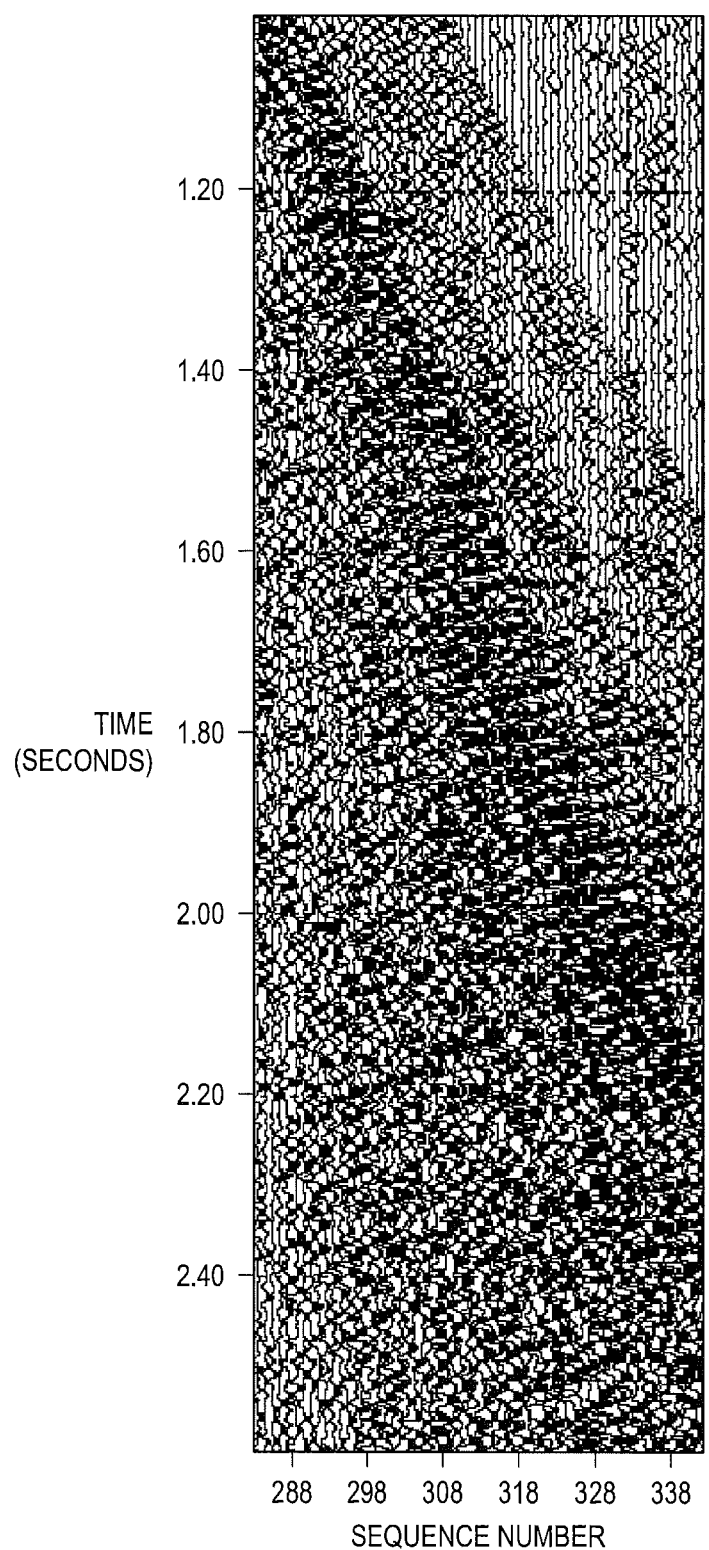
Figure 7E:
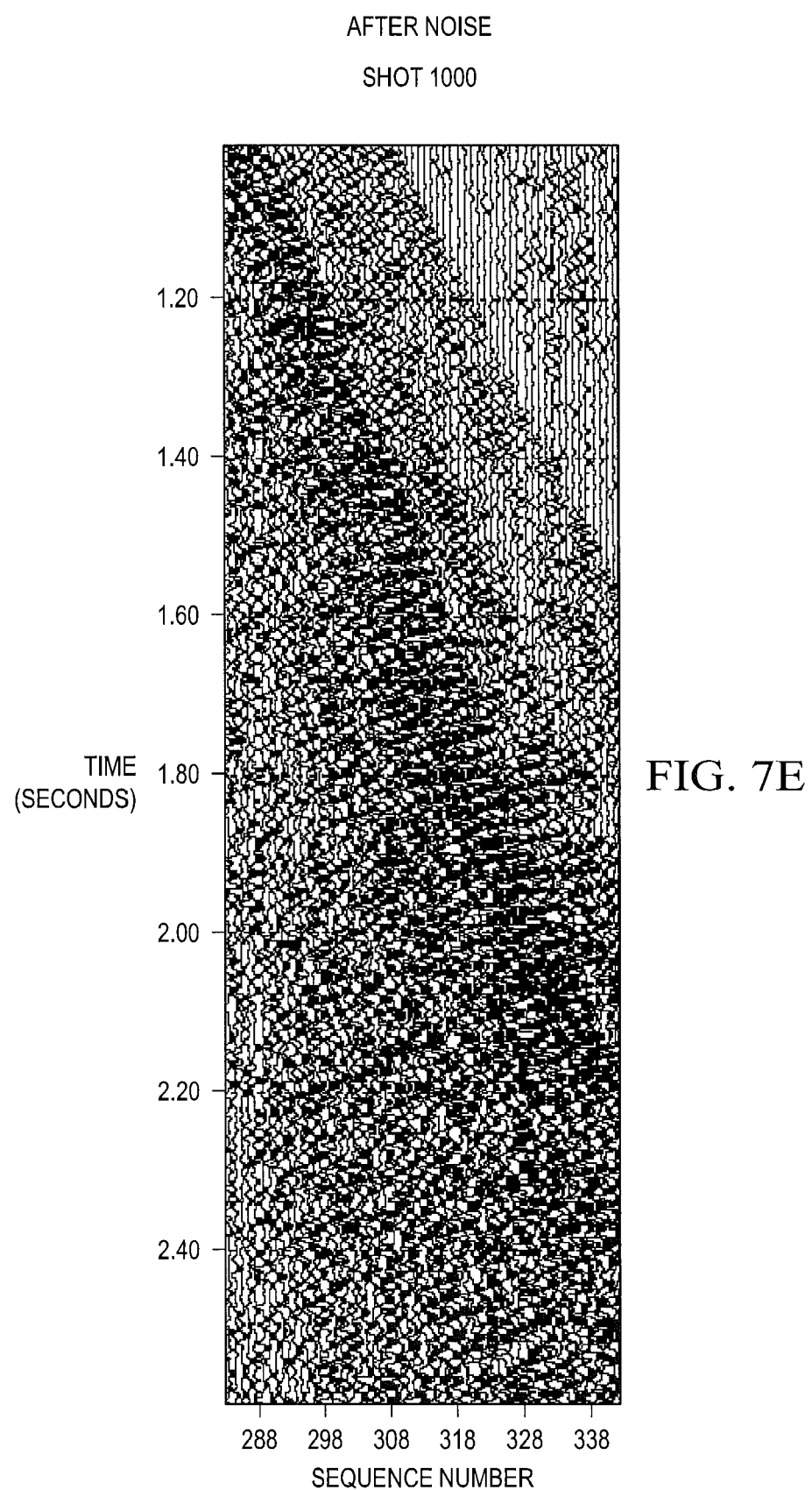

FIGS. 7A through 7E are further illustrative comparisons between dip-steering median filter according to the present invention and conventional f-x predictive deconvolution. FIG. 7A is an extremely noisy shot gather. FIG. 7B is an illustration of the remaining signal after filtering the data shown in FIG. 7A by dip-steering median filter according to the present invention. FIG. 7D is an illustration of the remaining signal after processing the FIG. 7A data by prior art f-x predictive deconvolution. Both results are the best picks from a series of trial parameters for each filter. It can be observed that the dip-steering median filter preserves more signal than the f-x predictive deconvolution. FIG. 7C is a plot of the differences in data content between FIGS. 7A and 7B, while FIG. 7E is a plot of the differences between FIGS. 7A and 7D.

Achieving a better signal-to-noise ratio is always a challenge for land seismic data processing. FIGS. 6A and 7A show the examples of low S/N ratio seismic gathers. While a conventional median filter may eliminate random noises like those shown in FIGS. 6A and 7A, it performs poorly on dipping events, especially events with conflicting dips. The present invention solves these problems and enhances the signal-to-noise ratio in the data while well preserving the meaningful information content of the signals.

From the foregoing, it can be seen that the present invention provides a frequency-waveform filter and Fourier-radial transform of seismic data with a subsequent median filter. Accordingly, the present invention avoids the effects of median filtering which conventionally flattens lateral events in the seismic data. By performing iterations during the summing along the indicated dominant dips in the data, the present invention provides the ability to deal with the presence of conflicting dips in the data, which other denoising methods cannot, so far as is known, deal with.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined processing methodology, or in the utilization of the results thereof, requires the claimed matter in the following claims; such modifications shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of processing a pre-stack seismic gather, in which time-spatial processing results of the pre-stack seismic gather indicate conflicting dips in subsurface formation structure, to attenuate random noise in the pre-stack seismic gather, comprising the computer implemented processing steps of:
   (a) assembling the time-spatial processing results of the pre-stack seismic gather in the computer to form a series of overlapping time-spatial sample windows of the pre-stack seismic gather;
   (b) transforming an individual one of the time-spatial sample windows of the pre-stack seismic gather into a frequency-wavenumber domain;
   (c) transforming the individual time-spatial sample window from the frequency-wave number domain into a Fourier-radial domain;
   (d) determining a map of peak values of the individual time-spatial sample window in the Fourier-radial domain;
   (e) transforming selected ones of the peak values of the individual time-spatial sample window in the Fourier-radial domain to indicate dominant dips in subsurface formation structure in the individual time-spatial sample window;
   (f) applying a median filter to the individual time-spatial window along a selected one of the indicated dominant dips in subsurface formation structure to attenuate noise from the individual time-spatial sample window; and
   (g) storing the remaining signal in the median filtered individual time-spatial sample window;
   (h) determining whether each of the indicated dominant dips in subsurface formation structure for the individual time spatial sample window has been selected; and
   (i) if not, selecting another indicated dominant dip in subsurface structure and repeating steps (f) and (g) along the selected another indicated dominant dip in subsurface formation structure; or
   (j) if so, forming a sum of the stored remaining signal of the median filtered individual time-spatial sample window along the selected dominant dips in subsurface formation structure;
   (k) determining whether each of the sample windows of the assembled pre-stack seismic gather have been selected; and
   (l) if not, selecting an additional one of the sample windows of the assembled pre-stack seismic gather and returning to step (b) for performing steps (b) through (h) on the data of the additional one of the assembled pre-stack seismic gather; or
   (m) is so, storing formed sums as a noise attenuated median filtered pre-stack seismic gather for each of the overlapping time-spatial sample windows; and
   (n) displaying the noise attenuated median filtered pre-stack seismic gather each of the overlapping sample windows for more accurate representations of the seismic survey results in areas of interest.

2. The computer implemented method of claim 1; wherein the step of determining a map of peak values comprises the step of:

determining a sum for each of the samples in the Fourier-radial domain.

3. The computer implemented method of claim 2, wherein the step of applying a median filter comprises the step of:
   applying a median filter to the dips in subsurface formation structure in a descending sequence of the dips.

4. A data processing system for processing a pre-stack seismic gather, in which time-spatial processing results of the pre-stack seismic gather indicate conflicting dips in subsurface formation structure, to attenuate random noise in the pre-stack seismic gather, the data processing system comprising:
   a data storage memory storing the time-spatial processing results of the pre-stack seismic gather;
   a processor for performing the steps of:
   (a) assembling the time-spatial processing results of the pre-stack seismic gather in the computer to form a series of overlapping time-spatial sample windows of the pre-stack seismic gather;
   (b) transforming an individual one of the time-spatial sample windows of the pre-stack seismic gather into a frequency-wavenumber domain;
   (c) transforming the individual; time-spatial sample window from the frequency-wavenumber domain into a Fourier-radial domain;
   (d) determining a map of peak values of the individual time-spatial sample window in the Fourier-radial domain;
   (e) transforming selected ones of the peak values of the individual time-spatial sample window in the Fourier-radial domain to indicate dominant dips in subsurface formation structure in the individual time-spatial sample window;
   (f) applying a median filter to the individual time-spatial sample window along the indicated dominant dips in subsurface formation structure to attenuate noise from the individual time-spatial sample window; and
   (g) storing the remaining signal of the median filtered the individual time-spatial sample window;
   (h) determining whether each of the indicated dominant clips in subsurface formation structure for the individual time-spatial sample window has been selected; and
   (i) if not, selecting another indicated dominant dip in subsurface structure and repeating steps (f) and (g) along the selected another indicated dominant dip in subsurface formation structure; or
   (j) if so, forming a sum of the stored remaining signal of the median filtered individual time-spatial sample window along the selected dominant dips in subsurface formation structure:
   (k) determining whether each of the sample windows of the assembled pre-stack seismic gather have been selected; and
   (l) if not, selecting an additional one of the sample windows of the assembled pre-stack seismic gather and returning to step (b) for performing steps (b) through (h) on the data of the additional one of the assembled pre-stack seismic gather; or
   (m) if sp, storing the formed sums as a noise attenuated median filtered pre-stack seismic gather for each of the overlapping time-spatial sample windows; and
   a display which forms an output record of the noise attenuated median filtered pre-stack seismic gather for each of the overlapping windows for more accurate representations of the seismic survey results in areas of interest.

5. The data processing system of claim 4, wherein the processor in performing the step of determining a map of peak values performs the step of:

determining a sum for each of the samples in the Fourier-radial domain.

6. The data processing system of claim 4, wherein the processor in performing the step of applying a median filter performs the step of:

applying a median filter to the dips in subsurface formation structure in a descending sequence of the dips.

7. A computer implemented method of processing a post-stack seismic section, in which time-spatial processing results of the post-stack seismic section indicate conflicting dips in subsurface formation structure, to attenuate random noise in the post-stack seismic section, comprising the computer implemented processing steps of:

(a) assembling the time-spatial processing results of post-stack seismic section in the computer to form a series of overlapping time-spatial sample windows of the post-stack seismic section;

(b) transforming an individual one of the time-spatial sample windows of the post-stack seismic section into a frequency-wavenumber domain;

(c) transforming the individual time-spatial sample window from the frequency-wavenumber domain into a Fourier-radial domain;

(d) determining a map of peak values of the individual time-spatial sample window in the Fourier-radial domain;

(e) transforming selected ones of the peak values of the individual time-spatial sample window in the Fourier-radial domain to indicate dominant dips in subsurface formation structure in the individual time-spatial sample window;

(f) applying a median filter to the individual time-spatial sample window along a selected one of the indicated dominant dips in subsurface formation Structure to attenuate noise from the individual time-spatial sample window; and (g) storing the remaining signal in the median filtered individual time-spatial sample window;

(h) determining whether each of the indicated dominant dips in subsurface formation structure for the individual time-spatial sample window has been selected; and (i) if not, selecting another indicated dominant dip in subsurface structure and repeating steps (f) and (g) along the selected another indicated dominant dip in subsurface formation structure; or (j) if so, forming a sum of the stored remaining signal of the median filtered individual time-spatial sample window along the selected dominant dips in subsurface formation structure;

(k) determining whether each of the sample windows of the assembled post-stack seismic section have been selected; and (l) if not, selecting an additional one of the sample windows of the assembled post-stack seismic section and returning to step (b) for performing steps (b) through (h) on the data of the additional one of the assembled post-stack seismic section; or (m) if so, storing the formed sums as a noise attenuated median filtered post-stack seismic section for each of the overlapping time-spatial sample windows; and (n) displaying the noise attenuated median filtered post-stack seismic section for each of the overlapping sample windows for more accurate representations of the seismic survey results in areas of interest.

8. A data processing system for processing a post-stack seismic section, in which time-spatial processing results of the post-stack seismic section indicate conflicting dips in subsurface formation structure, to attenuate random noise in the post-stack seismic section, the data processing system rising:

a data storage memory storing the time-spatial processing results of the post-stack seismic section;

a processor for performing the steps of:

(a) assembling the time-spatial processing results of the post-stack seismic section in the computer to form a series of overlapping time-spatial sample windows of the post-stack seismic section;

(b) transforming an individual one of the time-spatial sample windows of the post-stack seismic section into a frequency-wavenumber domain;

(c) transforming the individual time-spatial sample window from the frequency-wavenumber domain into a Fourier-radial domain;

(d) determining a map of peak values of the individual time-spatial sample window in the Fourier-radial domain;

(e) transforming selected ones of the peak values of the individual time-spatial sample window in the Fourier-radial domain to indicate dominant dips in subsurface formation structure in the individual time-spatial sample window;

(f) applying a median filter to the individual time-spatial sample window along the indicated dominant dips in subsurface formation structure to attenuate noise from the individual time-spatial sample window; and (g) storing the remaining signal of the median filtered the individual time-spatial sample window;

(h) determining whether each of the indicated dominant dips in subsurface formation structure for the individual time-spatial sample window has been selected; and (i) if not, selecting another indicated dominant dip in subsurface structure and repeating steps (f) and (g) along the selected another indicated dominant dip in subsurface formation structure; or (j) if so, forming a sum of the stored remaining signal of the median filtered individual time-spatial sample window along the selected dominant dips in subsurface formation structure;

(k) determining whether each of the sample windows of the assembled post-stack seismic section have been selected; and (l) if not, selecting an additional one of the sample windows of the assembled post-stack seismic section and returning to step (b) for performing steps (b) through (h) on the data of the additional one of the assembled post-stack seismic section; or (m) if so, storing the formed sums as a noise attenuated median filtered post-stack seismic section for each of the overlapping time-spatial sample windows; and a display which forms an output record of the noise attenuated median filtered post-stack seismic section for each of the overlapping sample windows for more accurate representations of the seismic survey results in areas of interest.

\* \* \* \* \*